May 19, 1925.
E. PÖHLER
1,538,588
CHARGING OF LEAD STORAGE BATTERIES
Filed April 20, 1923
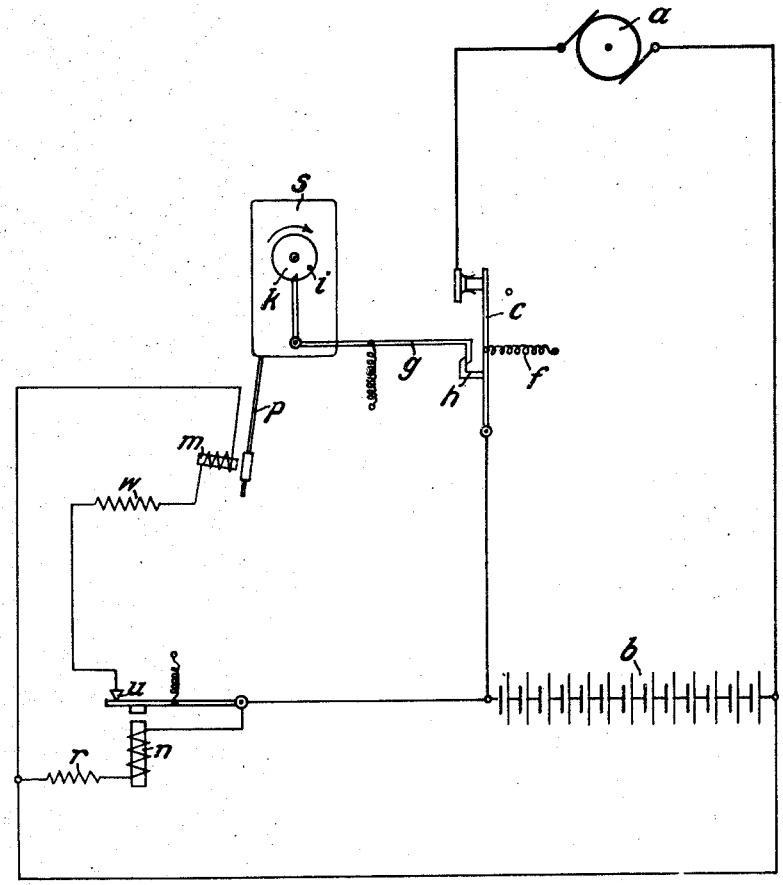
Inventor:
Ernst Pöhler
by
Attorney.

Patented May 19, 1925.

1,538,588

UNITED STATES PATENT OFFICE.

ERNST PÖHLER, OF HAGEN, GERMANY.

CHARGING OF LEAD STORAGE BATTERIES.

Application filed April 20, 1923. Serial No. 633,450.

*To all whom it may concern:*

Be it known that I, ERNST PÖHLER, a citizen of Germany, residing at Hagen, Westphalia, Germany, have invented certain new and useful Improvements in Charging of Lead Storage Batteries, of which the following is a specification.

My invention relates to the automatic charging of lead storage batteries, chiefly such of electrically driven power vehicles.

In a number of cases, for instance, when charging the batteries of electromobiles from municipal mains during the night-time, it is desirable to automatically cut out the charging current at the end of the charge. For this purpose it has been suggested to use an amp-hour meter which is constantly connected up to the battery and interrupts the charging current as soon as the previously extracted current plus a certain extra amount has been charged into the battery. The disadvantages of this method are that the accuracy and life of most meters are reduced by the shaking and jolting of the cars when travelling, and furthermore, an expensive meter is necessary for every individual battery. Attempts have also been made to cut the charging current out by means of relays which are actuated as soon as the battery voltage has reached the final value of about 2.7 volts. This method is also not reliable, for the pressure curve at the end of the charge is so extremely flat that slight variations in the sensibility of the relay or in the position of the curve at this point cause a very considerable mistake in the length of the charge. Such variations in the curve may take place as a result of temperature fluctuations, slight impurities in the cells, or the short-circuiting of one cell in a battery, etc. The well-known arrangement by which a relay, clock-work or meter is started as soon as a voltage corresponding to the full charge is reached, and cuts the battery out of circuit after a predetermined lapse of time, or when a certain amount of current has been charged into the battery, so that the latter receives an accurately measured overcharge, is also not reliable for the above mentioned reasons.

These shortcomings are avoided by the present invention, which is based upon the following new observation:—If on one occasion the whole, and on another only a part of the capacity is taken out of a battery, the amount of current required during the subsequent charges to bring the battery to the point of gassing will vary, but not those amounts required after gassing commences until the battery is fully charged. Gassing commences when 2.3 to 2.4 volts per cell is attained, at which point the pressure curve rises very sharply. The process therefore consists in automatically interrupting the charge after the battery has received a certain amount of current, which is fixed by experience, subsequent to the gassing point or when 2.4 volts per cell has been attained, quite immaterial of the quantity of current taken out of the battery during the preceding discharge. The charging current may be switched out in known manner by means of an amp-meter, which however, contrary to the above mentioned arrangement, is only switched into the circuit when the pressure has reached 2.4 volts. A simple clock-work may be used instead of the amp-hour meter when charging always takes place from the same supply mains and with the same resistance, the said clock-work being always started at the same time and set to cut out the charging current at a predetermined time, for under these conditions the amount of current put into the battery in a certain time always remains the same. The switching in of the meter or the starting of the clock-work takes place in known manner by means of a relay actuated as soon as the pressure reaches 2.4 volts per cell. As the pressure curve rises very sharply at this point, as mentioned above, a small mistake in the sensitiveness of the relay, or a slight alteration in the battery voltage has very little influence on the time at which the relay starts the clockwork or meter, and consequently also on the end of the charge. It will also be unnecessary to provide for each battery a special device for cutting out the charging current, as the apparatus does not require to be connected up to the battery during the discharge, and is consequently advisably left at the charging station. For the same reason the apparatus is not subjected to any damage as a result of shaking and jolting when the vehicle is travelling.

If it is desired to reduce the charging current simultaneously with the commencement of gassing by switching operations which either increase the resistance in the charging circuit or reduce the pressure at the mains, instead of leaving it solely to the action of those resistances which are continuously in the charging circuit, such switching operations may also advantageously be automatically brought about by the above mentioned relay in immediate connection with the clock-work which it controls.

My invention can be carried out in practice in various ways. An arrangement for use in connection therewith is shown diagrammatically, by way of example, in the single figure of the accompanying drawing, in which $a$ designates the source of current, $b$ the battery to be charged, and $c$ a cut-out arranged therebetween. This cut-out is subject to the pull of a spring $f$ which tends to open it, but the cut-out is normally kept closed (as in the figure) by the hook-shaped adjacent end $g^1$ of a bell-crank lever $g$ fulcrumed at $x$ to the casing $s$ of a clock-work subject to the pull of a spring $y$. The end $g^1$ of the lever $g$ engages a hook $h$ secured to the cut-out, and the other arm $g^2$ of the lever extends upwards into the path of a pin $i$ affixed to a disk $k$ rotated by said clock-work in the direction indicated by the arrow. The cut-out is disengaged from the lever $g$ as soon as the arm $g^2$ thereof is acted upon by the pin $i$.

The velocity of the disk $k$ or, in other words, the length of the path to be covered by the pin $i$ is adjustable.

$p$ is the pendulum of the clock-work $s$; it consists either wholly or partly of iron and is held fast in one of its end positions by the core of a solenoid $m$, the windings of which are connected with the battery $b$ by the intermediary of a series resistance $w$ and a contact $u$, which latter is opened when its armature $u^1$ is attracted by an electromagnet $n$. This occurs as soon as the current passing through this electromagnet and through a series resistance $r$ has attained a certain strength, that is to say, as soon as the voltage of the battery has surpassed a certain limit.

The manner of operation of the device is as follows:

In order to charge the battery, the cut-out is closed and is retained in this position by the hook $g^1$ of the lever $g$ engaging the hook $h$ of the cut-out.

The pendulum $p$ of the clock-work $s$ is retained by the core of the solenoid $m$ which is excited owing to its circuit being closed at $u$. As soon as the voltage of the battery $b$ has reached that limit at which gas is developed, viz., about 2.4 volt per cell, the electromagnet $n$ attracts the armature $u^1$, the respective circuit being adjusted to the voltage mentioned by means of the resistance $r$. The contact at $u$ is now broken, the circuit containing the solenoid $m$ becomes currentless, and the pendulum $p$ is released, as is, consequently, also the clock-work $s$. Previously thereto, the clock-work, more particularly the disk $k$, had been so adjusted that after a predetermined period of time commencing at the moment of the release of the pendulum $p$ the pin $i$ touches the arm $g^2$ of the lever $g$, thus turning this lever and disengaging its hook $g^1$ from the hook $h$ of the cut-out $c$ which is now opened by the spring $f$. The charging circuit is, thus, interrupted and the charging finished.

I wish it to be understood that I do not desire to be limited to the exact sequence of operations nor to the details of construction shown and described, for obvious modifications will occur to a person skilled in the art.

I claim:

1. The method of charging accumulator batteries which consists in passing a current through a cell until the commencement of gassing, then setting the charging rate at a predetermined amount of current, and finally interrupting the charging operation at a time fixed with relation to the point of commencement of gassing aforesaid.

2. The method of operating a battery charging system composed of time-controlled mechanism and means for starting said mechanism into operation, which consists in setting the said starting means to start the time mechanism substantially at the commencement of gassing, and setting the time-controlled mechanism to interrupt the charging operation at a time fixed with relation to the point of commencement of gassing.

3. The method of operating a battery charging system composed of means for automatically cutting off the charging current, and automatic voltage responsive means, which consists in setting the last-named means so as to render the cutting-off means operative substantially at a point in the rise of the voltage where gassing occurs, and setting the cutting-off means to operate for a predetermined time fixed with relation to the gassing point aforesaid before cutting off the charging current.

In testimony whereof I affix my signature.

ERNST PÖHLER.